O. T. ALEXANDER.
RECORDING INSTRUMENT.
APPLICATION FILED OCT. 4, 1919.
1,368,092.
Patented Feb. 8, 1921.
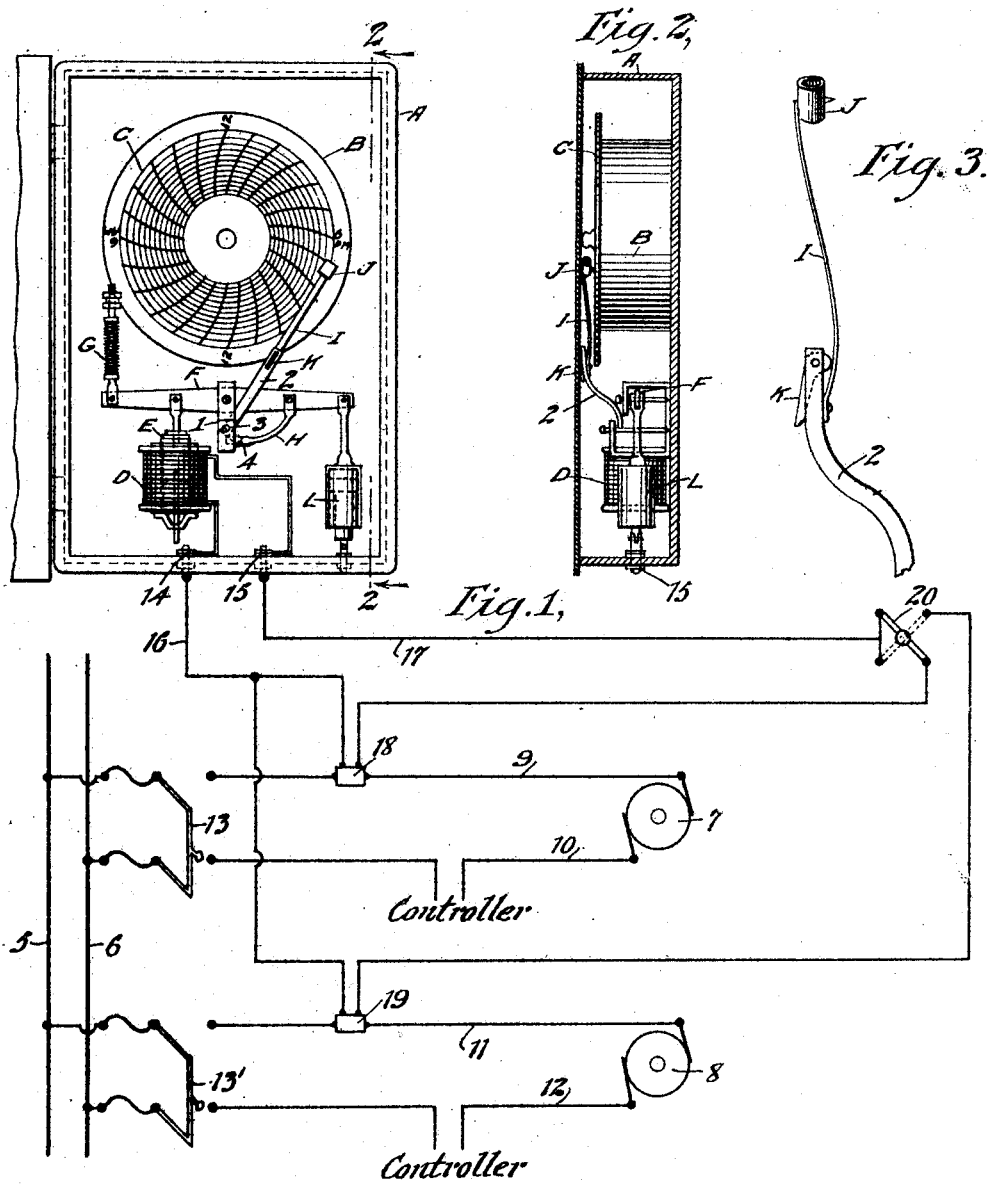
WITNESSES
W. F. Rathermund
J. W. Foster
INVENTOR
O. T. Alexander
BY Mumm Leo
ATTORNEYS

UNITED STATES PATENT OFFICE.

OLIVER T. ALEXANDER, OF ALTONPARK, TENNESSEE.

RECORDING INSTRUMENT.

1,368,092.  Specification of Letters Patent.  Patented Feb. 8, 1921.

Application filed October 4, 1919. Serial No. 328,389.

*To all whom it may concern:*

Be it known that I, OLIVER T. ALEXANDER, a citizen of the United States, and a resident of Altonpark, in the county of Hamilton and State of Tennessee, have invented a new and Improved Recording Instrument, of which the following is a full, clear, and exact description.

This invention relates to improvements in recording instruments, and more particularly to an electrically controlled recording device designed for use on electric pushing and leveling machines of by-product coke ovens and the like to record the time of, and the relative amount of current in each h. p. required on each oven operated.

A further object is to provide a recording instrument of the character stated, which in its dual capacity will register the time of the pushing and the leveling operations as well as the current used.

With these and other objects in view the invention consists in certain novel features of construction, and combinations and arrangements of parts, as will be more fully hereinafter described and pointed out in the claim.

In the accompanying drawings—

Figure 1 is a view partly in elevation and partly diagrammatic illustrating my improvements;

Fig. 2 is a view in section on the line 2—2 of Fig. 1; and

Fig. 3 is a fragmentary view in side elevation illustrating the pen and its mounting.

A represents a casing in which any suitable form of clock B is mounted and is adapted to revolve a chart C. This chart is in the form of a disk and can be removed and replaced as desired. A solenoid D is located in the lower portion of casing A and operates to attract an armature of soft iron E which is connected to a lever F pivotally supported between its ends on a bracket 1. A coiled spring G is operatively connected to the end of lever F and opposes the action of the solenoid D.

A pen carrier 2 is pivotally connected at one end to the bracket 1, as shown at 3, and is provided with a laterally projecting lug 4 which is connected to a frame H carried by the lever F so that the movement of the lever operates to swing the pen carrier. A spring arm I is secured to the pen carrier 2 and at its free end a standard capillary indicating pen J is provided adapted to engage the chart C.

A cam lever K is pivotally connected to the pen carrier 2 and is adapted, when in one position, to hold the pen in engagement with the chart and when swung to another position, to allow the spring arm I to move the pen away from the chart so that the old chart can be removed and a new chart can be readily connected to the clock. To prevent a too great deflection of the pen due to sudden abnormal current, an air dashpot L is provided in the casing A and connected to the lever F, as shown.

In Fig. 1, 1 illustrate diagrammatically a pair of electric current supplying bus-bars 5 and 6 which are connected electrically with motors 7 and 8 respectively. These motors 7 and 8 are independently operated and the motor 7 represents an operating means for a push ram and the motor 8 an operating means for a leveling ram. In other words, this view illustrates diagrammatically electrically operated motors 7 and 8, one for operating the push ram and the other for the leveling ram, and these motors are operated separately and never at the same time, and it is the purpose of my invention to automatically register the time of the pushing and the leveling operations, as will more fully hereinafter appear.

Any desired form of controllers may be provided in the circuit wires 9 and 10 of the motor 7 and in wires 11 and 12 of the motor 8, and these circuit wires 9 and 10 are adapted to be connected electrically with the bus-bars 5 and 6 by means of suitable switches 13 and 13'. The solenoid D, above referred to, is provided with a pair of terminals 14 and 15 respectively, and these terminals are connected by wires 16 and 17 and suitable shunts 18 and 19 respectively with the electric circuits of motors 7 and 8.

A three-way Hatchway switch 20 is provided in the shunt circuits and this Hatchway switch is moved by the mechanism which controls the pushing and the leveling operations so that when one operation is complete, the switch 20 is moved so as to close the shunt circuit with the motor for controlling the next operation. I have not attempted to show the automatic means for moving the switch 20 as it is possible that this switch might be moved manually and my invention is broad enough to cover the operation of the switch either automatically or manually.

The operation is as follows: When the switch 13 is moved so as to close the circuit to the motor 7, the push ram will be operated and the current used will be recorded through the medium of the shunt 18, switch 20, wires 16 and 17, terminals 14 and 15 to operate the solenoid D. As the disk C is revolved by the clock and as the pen J is moved inwardly across its face, it will record the amount of current used and the length of the line circumferentially will indicate the time of the current. When the leveling motor 8 is operated by closing the circuit switch 13', the solenoid D will be energized through the circuit including the shunt 19 and the wires, as above indicated, and as these operations take place in succession, the disk C will contain a complete record of the amount of current used in each operation and of the time involved.

Various slight changes may be made in the general form and arrangement of parts described without departing from the invention, and hence I do not limit myself to the precise details set forth but consider myself at liberty to make such changes and alterations as fairly fall within the spirit and scope of the appended claim.

I claim:

The combination with leveling ram and push ram motors, and an electric circuit controlling means for operating said motors, of a recording instrument comprising means for turning a record chart, a pen engaging the chart, a solenoid controlling the movements of the pen, and shunt circuits included in the motor circuits with the terminals of the solenoid, whereby the current utilized in the operation of the motors and the time of said operation is recorded on the chart.

OLIVER T. ALEXANDER.